(12) United States Patent
Shibazaki et al.

(10) Patent No.: US 8,395,573 B2
(45) Date of Patent: Mar. 12, 2013

(54) LIQUID CRYSTAL DISPLAY HAVING SUB-PIXELS PROVIDED WITH THREE DIFFERENT VOLTAGE LEVELS

(75) Inventors: Minoru Shibazaki, Kobe (JP); Keitaro Yamashita, Kobe (JP)

(73) Assignee: TPO Displays Corp., Chu-Nan (TW)

( * ) Notice: Subject to any disclaimer, the term of this patent is extended or adjusted under 35 U.S.C. 154(b) by 917 days.

(21) Appl. No.: 12/381,262

(22) Filed: Mar. 9, 2009

(65) Prior Publication Data
US 2009/0237343 A1  Sep. 24, 2009

(30) Foreign Application Priority Data
Mar. 21, 2008 (JP) .................................. 2008-073756

(51) Int. Cl.
G09G 3/36 (2006.01)

(52) U.S. Cl. ........................................... 345/92; 345/87

(58) Field of Classification Search ............ 345/87–104, 345/204–215, 690–699
See application file for complete search history.

(56) References Cited

U.S. PATENT DOCUMENTS

| 2004/0263760 A1* | 12/2004 | Kodate et al. ................. 349/151 |
| 2006/0103800 A1* | 5/2006 | Li et al. ........................ 349/129 |
| 2006/0262237 A1* | 11/2006 | Chen et al. ...................... 349/38 |
| 2007/0195234 A1* | 8/2007 | Hsu et al. ...................... 349/113 |
| 2008/0238817 A1* | 10/2008 | Mamba et al. ................... 345/55 |

* cited by examiner

Primary Examiner — Alexander Eisen
Assistant Examiner — Patrick F Marinelli
(74) Attorney, Agent, or Firm — Liu & Liu

(57) ABSTRACT

This present invention provides a liquid crystal display (LCD) device in which the sub-pixel is provided with three different voltage levels, so that image quality is improved without the configuration of additional gate lines. The present invention overcomes the reduction of aperture ratio in conventional LCD devices due to the configuration of additional gate lines. By the present invention, the white washout problem relating to the off-axis viewing angle can be overcome while the aperture ratio is not reduced.

12 Claims, 3 Drawing Sheets

LIQUID CRYSTAL DISPLAY HAVING SUB-PIXELS PROVIDED WITH THREE DIFFERENT VOLTAGE LEVELS

BACKGROUND OF THE INVENTION

1. Field of the Invention

The present invention relates to a liquid crystal display (LCD) device, and more particularly, to an LCD device that improves the issue of white washout relating to the off-axis viewing angle.

2. Description of the Related Art

Since LCD devices have the advantages of thin sizes and low power consumption, they are widely used as the screens of computers, portable electronic devices and televisions. Generally such an LCD device is constructed by a liquid crystal layer sandwiched between an upper substrate and a lower substrate, and then electrodes formed on the respective substrates are used to control the orientation of liquid crystal molecules for display.

Depending upon the brightness of environment, the so-called transflective LCD may function in two modes, including a transmissive mode utilizing the backlight and a reflective mode utilizing the incident light. The transflective LCD includes a transmissive area and a reflective area, in which the transmissive area is used in the transmissive mode, while the reflective area is used in the reflective mode. In the transmissive area, incident light coming from the backside of the display panel passes through the liquid crystal layer directly and then emits from the front side of the display panel. In the reflective area, incident light coming from the front side of the display panel passes through the liquid crystal layer and is reflected by a reflector, and then emits from the front side of the display panel.

Along with the expanding needs for small-sized LCDs used in devices like mobile phones, transflective LCD devices are required to provide higher image quality. For a conventional transflective LCD device, to make the respective gamma curves of the transmissive and reflective modes consistent, the liquid crystal cells in the transmissive and reflective areas are provided with varied cell gaps. However, this will make the manufacturing process more complicated. Further, because of the height difference in the boundary area, it is difficult to control the orientation of liquid crystal molecules with high accuracy. On the other hand, for applying different driving voltage levels for the reflective and transmissive modes, it requires to control the voltage by means of dividing pixels in the transmissive area, which causes the circuits to become complicated and reduces the aperture ratio as well.

FIG. 3 shows the gamma curve of a transflective LCD device disclosed in the JP Patent publication No. 2006-313358, wherein the pixels in the transmissive area are divided for voltage control. As FIG. 3 shows, compared to the gamma curve a, with a viewing angle of 0 degree at the front side, the gamma curve b, with a viewing angle of 45 degrees at the front side, is shifted. In this case, if pixels T1 and T2 in the transmissive area are provided with different signal voltages, the average luminance values from the viewing angle of 45 degrees at the front side will approach the gamma curve a, referring to the arrow in FIG. 3. As a result, the pixels in the transmissive area can be divided and thus provided with different signal voltages, making the average luminance values of this area approach those of the reflective area. Besides, the conventional LCD devices generally have the white washout problem relating to the off-axis viewing angle.

To overcome the white washout problem, two additional gate lines are arranged in the LCD device to control two different voltage levels to be applied to two pixel electrodes within a pixel unit. However, such construction will reduce the aperture ratio; moreover, when such construction is applied to a transflective LCD device, the corresponding data will not be written into the pixel electrodes in the reflective mode, which results in issues of white saturation and black saturation of the image.

SUMMARY OF THE INVENTION

An object of the present invention is to provide an LCD device in which the sub-pixel is provided with three different voltage levels, so that image quality is improved without the configuration of additional gate lines, and the reduction of aperture ratio in conventional LCD devices resulting from adding gate lines is also addressed.

An embodiment of the LCD device of the present invention comprises a source line, an n-th gate line, an n+1-th gate line and a sub-pixel. The sub-pixel is arranged on the n-th row and comprises a first semiconductor switch, a second semiconductor switch, a third semiconductor switch, a fourth semiconductor switch, a first pixel electrode, a second pixel electrode, a third pixel electrode and a fourth pixel electrode. The first semiconductor switch is electrically connected to the n-th gate line, the source line and the first pixel electrode, the n-th gate line enabling the source line and the first pixel electrode by switching on the first semiconductor switch. The second semiconductor switch is electrically connected to the n+1-th gate line, the first pixel electrode and the second pixel electrode, the n+1-th gate line enabling the first pixel electrode and the second pixel electrode by switching on the second semiconductor switch. The third semiconductor switch is electrically connected to the n-th gate line, the first pixel electrode and the third pixel electrode, the n-th gate line enabling the first pixel electrode and the third pixel electrode by switching on the third semiconductor switch. The fourth semiconductor switch is electrically connected to the n-th gate line, the second pixel electrode and the fourth pixel electrode, the n-th gate line enabling the second pixel electrode and the fourth pixel electrode by switching on the fourth semiconductor switch. After a data-writing period of the n-th row, the second pixel electrode and the fourth pixel electrode have a first voltage level, while the first pixel electrode and the third pixel electrode have a second voltage level. During a data-writing period of the n+1-th row, the n+1-th gate line enables the first pixel electrode and the second pixel electrode by switching on the second semiconductor switch so as to provide the first pixel electrode and the second pixel electrode with a third voltage level respectively.

In an embodiment of the present invention, during a data-writing period of the n-th row, the source line is provided with the first voltage level and the second voltage level sequentially. During a data-writing period of the n-th row, after the n-th gate line and the n+1-th gate line control the first voltage level and provide the first voltage level to the first pixel electrode, the second pixel electrode, the third pixel electrode and the fourth pixel electrode, the n-th gate line controls the second voltage level and provides the second voltage level to the first pixel electrode and the third pixel electrode. The third voltage level is between the first voltage level and the second voltage level. The first pixel electrode and the second pixel electrode are used in a reflective mode. The first semiconductor switch, the second semiconductor switch, the third semiconductor switch and the fourth semiconductor switch are thin film transistors. The LCD device is used in an electronic device.

A method for driving an LCD device of the present invention comprises the steps of: providing a first voltage level to a first pixel electrode, a second pixel electrode, a third pixel electrode and a fourth pixel electrode of a sub-pixel; providing a second voltage level to the first pixel electrode and the third pixel electrode of the sub-pixel; and during a data-writing period of pixels of the next row, enabling the first pixel electrode and the second pixel electrode so as to provide a third voltage level thereto.

With the LCD device of the present invention, the reduction of aperture ratio will be prevented, and the issue of white washout relating to the off-axis viewing angle is addressed.

DETAILED DESCRIPTION OF THE PREFERRED EMBODIMENTS

Figure 1:
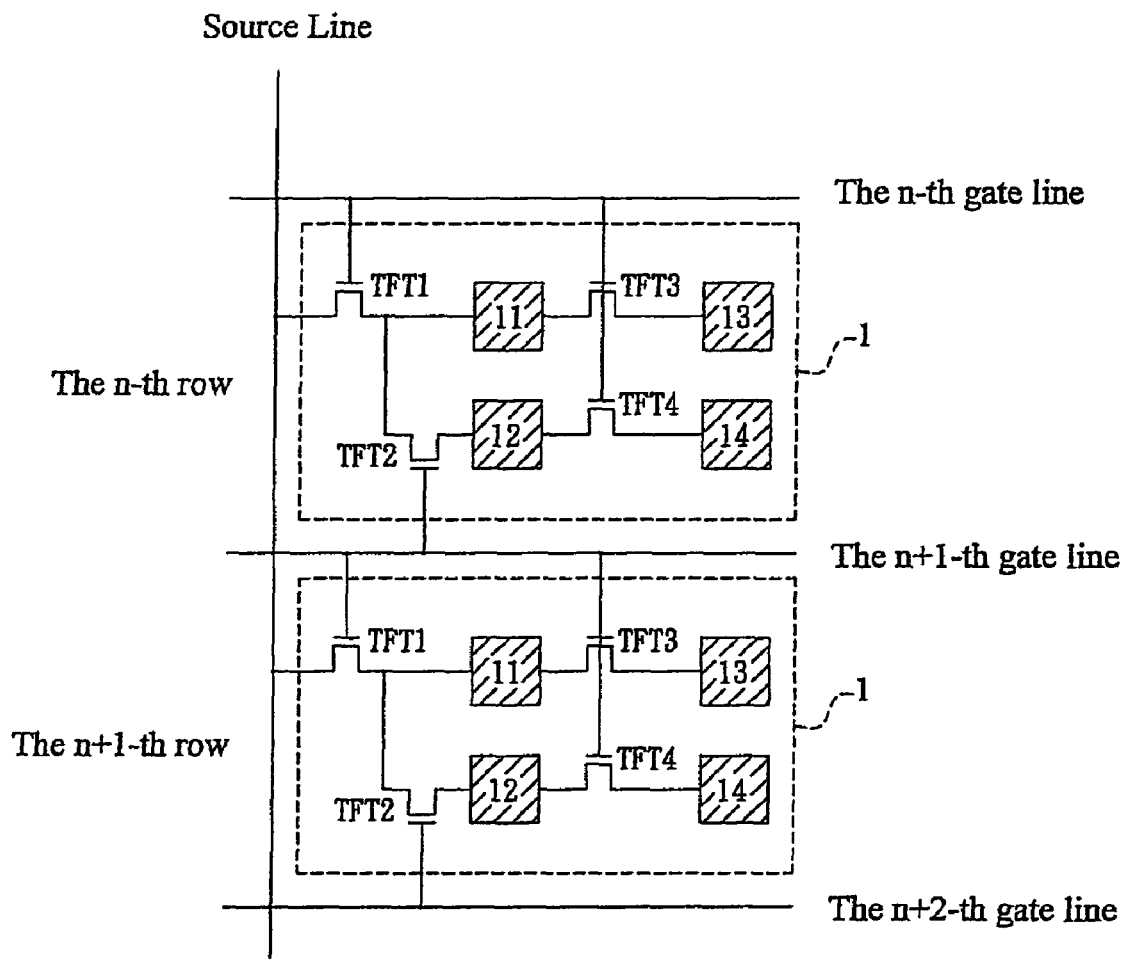
FIG. 1 is a schematic view showing the pixel arrangement of an embodiment of an LCD device of the present invention.

FIG. 1 is a schematic view showing the pixel arrangement of an embodiment of an LCD device of the present invention. As FIG. 1 shows, the LCD device comprises a source line, a plurality of gate lines and a sub-pixel 1. The sub-pixel 1 is arranged on the n-th row and comprises first to fourth semiconductor switches TFT1 to TFT4 and first to fourth pixel electrodes 11 to 14. The first semiconductor switch TFT1 is electrically connected to the n-th gate line, the source line and the first pixel electrode 11. The n-th gate line enables the source line and the first pixel electrode 11 by switching on the first semiconductor switch TFT1. The second semiconductor switch TFT2 is electrically connected to the n+1-th gate line, the first pixel electrode 11 and the second pixel electrode 12. The n+1-th gate line enables the first pixel electrode 11 and the second pixel electrode 12 by switching on the second semiconductor switch TFT2. The third semiconductor switch TFT 3 is electrically connected to the n-th gate line, the first pixel electrode 11 and the third pixel electrode 13. The n-th gate line enables the first pixel electrode 11 and the third pixel electrode 13 by switching on the third semiconductor switch TFT3. The fourth semiconductor switch TFT4 is electrically connected to the n-th gate line, the second pixel electrode 12 and the fourth pixel electrode 14. The n-th gate line enables the second pixel electrode 12 and the fourth pixel electrode 14 by switching on the fourth semiconductor switch TFT4.

In this embodiment, the first to fourth semiconductor switches TFT1 to TFT4 are N-type TFTs. The first semiconductor switch TFT1 has a source terminal connected to the source line, a drain terminal connected to the first pixel electrode 11, and a gate terminal connected to the n-th gate line. The second semiconductor switch TFT2 has a source terminal connected to the drain terminal of the first semiconductor switch TFT1, a drain terminal connected to the second pixel electrode 12, and a gate terminal connected to the n+1-th gate line. The third semiconductor switch TFT3 has a source terminal connected to the first pixel electrode 11, a drain terminal connected to the third pixel electrode 13, and a gate terminal connected to the n-th gate line. The fourth semiconductor switch TFT4 has a source terminal connected to the second pixel electrode 12, a drain terminal connected to the fourth pixel electrode 14, and a gate terminal connected to the n-th gate line.

Moreover, the first to fourth semiconductor switches TFT1 to TFT4 are not limited to N-type TFTs; they can be P-type TFTs as well.

Figure 2:
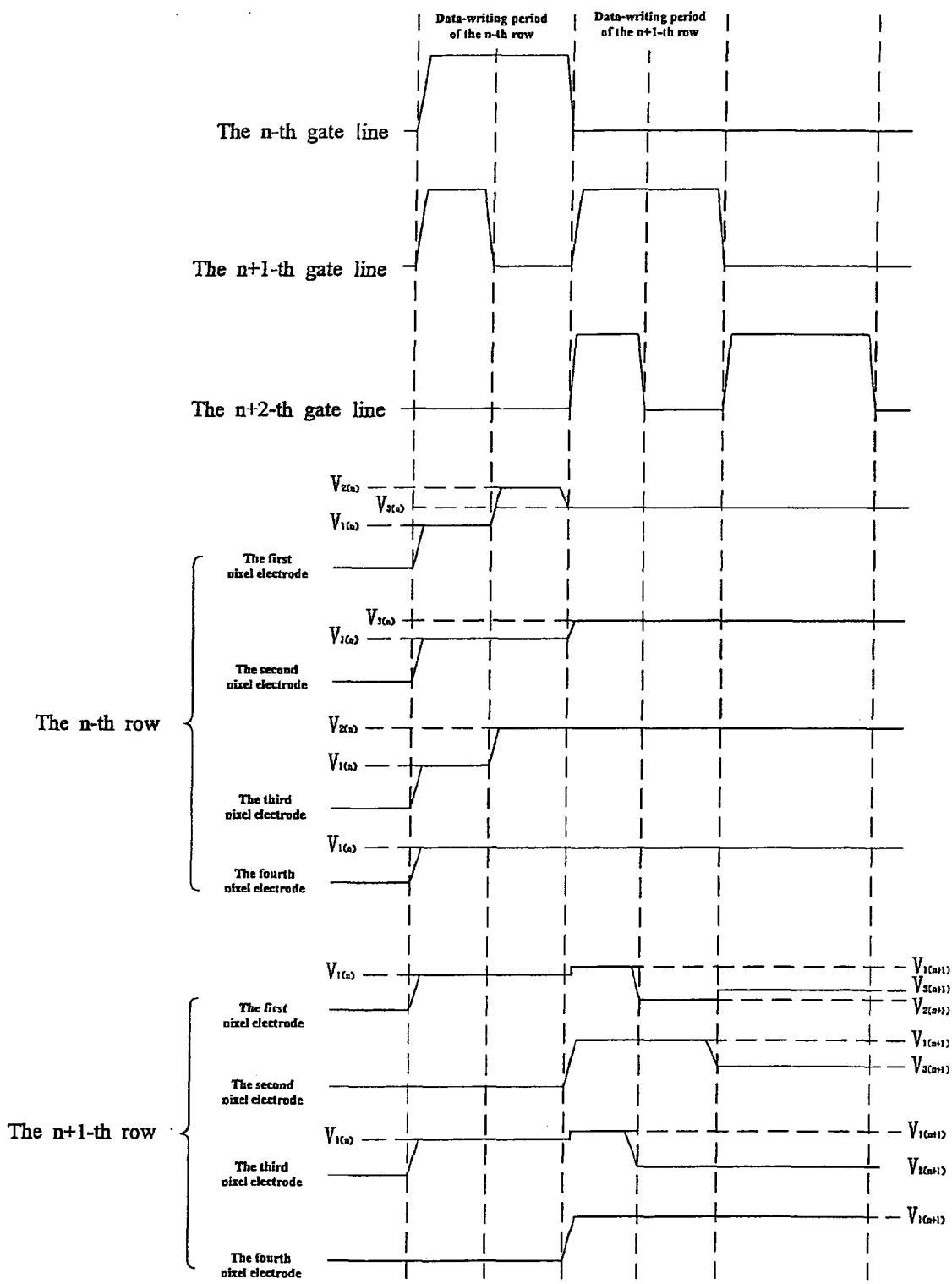
FIG. 2 is a timing diagram showing the driving circuit of an embodiment of an LCD device of the present invention.
Figure 3:
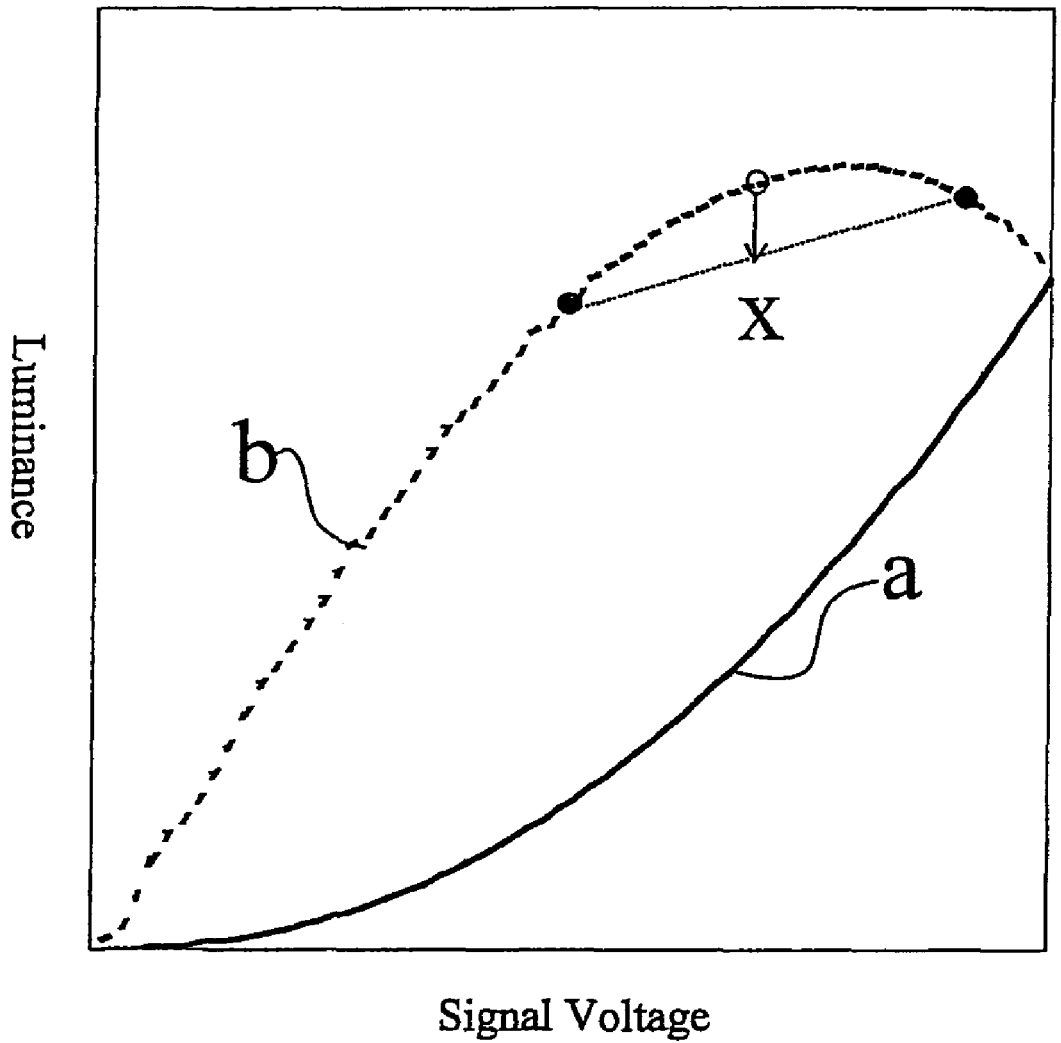
FIG. 3 is a diagram showing the gamma curve of a conventional transflective LCD device according to the prior art.

FIG. 2 is a timing diagram showing a method for driving an LCD device of the present invention. First, during the data-writing period of the n-th row, the source line is provided with a first voltage level $V1(n)$ and a second voltage level $V2(n)$ sequentially. In detail, the n-th gate line and the n+1-th gate line of the next row control the first to fourth semiconductor switches TFT1 to TFT4 and switch all of them on; thus, the source line provides with the first voltage level $V1(n)$ to the first to fourth pixel electrodes 11 to 14. Since the n-th gate line switches on the first semiconductor switch TFT1, the third semiconductor switch TFT3 and the fourth semiconductor switch TFT4 only, the voltage level of the pixel electrodes 12 and 14 are set at the first voltage level $V1(n)$. The source line, then, provides with the second voltage level $V2(n)$ to the other pixel electrodes 11 and 13.

In addition, during the data-writing period of the n-th row, the first voltage level $V1(n)$ may be given to the first semiconductor switch TFT1 and the third semiconductor switch TFT3 of a pixel on the next row. Then, the first voltage level $V1(n)$ is provided for the pixel electrodes 11 and 13, and the correct data of the next row will be written into them accordingly.

Next, during the data-writing period of the n+1-th row, the n+1-th gate line controls the second semiconductor switch TFT2 of the n-th row and switches it on, enabling the first pixel electrode 11, which is provided with the first voltage level $V1(n)$, and the second pixel electrode 12, which is provided with the second voltage level $V2(n)$. Therefore, during the data-writing period of the n+1-th row, the first pixel electrode 11 and the second pixel electrode 12 of the n-th row is provided with a third voltage level $V3(n)$, which is between the first voltage level $V1(n)$ and the second voltage level $V2(n)$. As a result, a pixel structure will comprise pixel electrodes of three different voltage levels.

Similarly, since the steps with respect to the n-th gate line and the sub-pixel of the n-th row can be applied to those of the n+1-th row, the correct data will be written into the pixel electrodes 11 and 13 of the n+1-th row.

With an LCD device of the present invention, a sub-pixel can comprise pixel electrodes of three different voltage levels without the configuration of additional gate lines or source lines. As a result, aperture ratio of the LCD device is not reduced, and the image quality is enhanced. Furthermore, by using the third and fourth pixel electrodes in the transmissive mode, and the first and second pixel electrodes in the reflective mode, the issue of white washout relating to the off-axis viewing angle can be addressed. Besides, the disadvantage of issues of white saturation and black saturation of the image can be avoided.

The LCD device of the present invention may also be used in a portable electronic device such as mobile phone, digital camera, PDA, automotive display, aircraft display, digital photo frame or portable DVD player.

What is claimed is:
1. A liquid crystal display (LCD) device, comprising:
a source line;
an n-th gate line, where n is an integer greater than or equal to 1;
an n+1-th gate line; and
a sub-pixel of the n-th row, said sub-pixel comprising a first semiconductor switch, a second semiconductor switch, a third semiconductor switch, a fourth semiconductor switch, a first pixel electrode, a second pixel electrode, a third pixel electrode and a fourth pixel electrode;

wherein said first semiconductor switch is directly electrically connected to said n-th gate line, said source line and said first pixel electrode, said n-th gate line enabling said source line and said first pixel electrode by switching on said first semiconductor switch; said second semiconductor switch is directly electrically connected to said n+1-th gate line, said first pixel electrode and said second pixel electrode, said n+1-th gate line enabling said first pixel electrode and said second pixel electrode by switching on said second semiconductor switch; said third semiconductor switch is directly electrically connected to said n-th gate line, said first pixel electrode and said third pixel electrode, said n-th gate line enabling said first pixel electrode and said third pixel electrode by switching on said third semiconductor switch; said fourth semiconductor switch is directly electrically connected to said n-th gate line, said second pixel electrode and said fourth pixel electrode, said n-th gate line enabling said second pixel electrode and said fourth pixel electrode by switching on said fourth semiconductor switch; and wherein during a data-writing period of the n-th row, said second pixel electrode and said fourth pixel electrode have a first voltage level, while said first pixel electrode and said third pixel electrode have a second voltage level; and during a data-writing period of the n+1-th row, said n+1-th gate line enables said first pixel electrode and said second pixel electrode by switching on said second semiconductor switch so as to provide said first pixel electrode and said second pixel electrode with a third voltage level respectively.

2. The LCD device of claim 1, wherein during a data-writing period of the n-th row, said source line provides with said first voltage level and said second voltage level sequentially.

3. The LCD device of claim 2, wherein during a data-writing period of the n-th row, after said n-th gate line and said n+1-th gate line control said first voltage level and write said first voltage level to said first pixel electrode, said second pixel electrode, said third pixel electrode and said fourth pixel electrode, said n-th gate line controls said second voltage level and writes said second voltage level to said first pixel electrode and said third pixel electrode.

4. The LCD device of claim 1, wherein said third voltage level is between said first voltage level and said second voltage level.

5. The LCD device of claim 1, wherein said first pixel electrode and said second pixel electrode are used in a reflective mode.

6. The LCD device of claim 1, wherein said first semiconductor switch, said second semiconductor switch, said third semiconductor switch and said fourth semiconductor switch are thin film transistors.

7. An electronic device, comprising an LCD device, which comprises:
a source line;
an n-th gate line, where n is an integer greater than or equal to 1;
an n+1-th gate line; and
a sub-pixel of the n-th row, said sub-pixel comprising a first semiconductor switch, a second semiconductor switch, a third semiconductor switch, a fourth semiconductor switch, a first pixel electrode, a second pixel electrode, a third pixel electrode and a fourth pixel electrode;

wherein said first semiconductor switch is directly electrically connected to said n-th gate line, said source line and said first pixel electrode, said n-th gate line enabling said source line and said first pixel electrode by switching on said first semiconductor switch; said second semiconductor switch is directly electrically connected to said n+1-th gate line, said first pixel electrode and said second pixel electrode, said n+1-th gate line enabling said first pixel electrode and said second pixel electrode by switching on said second semiconductor switch; said third semiconductor switch is directly electrically connected to said n-th gate line, said first pixel electrode and said third pixel electrode, said n-th gate line enabling said first pixel electrode and said third pixel electrode by switching on said third semiconductor switch; said fourth semiconductor switch is directly electrically connected to said n-th gate line, said second pixel electrode and said fourth pixel electrode, said n-th gate line enabling said second pixel electrode and said fourth pixel electrode by switching on said fourth semiconductor switch; and wherein during a data-writing period of the n-th row, said second pixel electrode and said fourth pixel electrode have a first voltage level, while said first pixel electrode and said third pixel electrode have a second voltage level; and during a data-writing period of the n+1-th row, said n+1-th gate line enables said first pixel electrode and said second pixel electrode by switching on said second semiconductor switch so as to provide said first pixel electrode and said second pixel electrode with a third voltage level respectively.

8. The electronic device of claim 7, wherein during a data-writing period of the n-th row, said source line provides with said first voltage level and said second voltage level sequentially.

9. The electronic device of claim 8, wherein during a data-writing period of the n-th row, after said n-th gate line and said n+1-th gate line control said first voltage level and write said first voltage level to said first pixel electrode, said second pixel electrode, said third pixel electrode and said fourth pixel electrode, said n-th gate line controls said second voltage level and writes said second voltage level to said first pixel electrode and said third pixel electrode.

10. The electronic device of claim 7, wherein said third voltage level is between said first voltage level and said second voltage level.

11. The electronic device of claim 7, wherein said first pixel electrode and said second pixel electrode are used in a reflective mode.

12. The LCD device of claim 7, wherein said first semiconductor switch, said second semiconductor switch, said third semiconductor switch and said fourth semiconductor switch are thin film transistors.

* * * * *